US011021309B2

(12) United States Patent
Nohara et al.

(10) Patent No.: US 11,021,309 B2
(45) Date of Patent: Jun. 1, 2021

(54) CUSHION MEMBER, PACKAGE BODY

(71) Applicant: KYOCERA Document Solutions Inc., Osaka (JP)

(72) Inventors: Yuta Nohara, Osaka (JP); Yoshihiro Ando, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 22 days.

(21) Appl. No.: 16/737,236

(22) Filed: Jan. 8, 2020

(65) Prior Publication Data

US 2020/0216251 A1    Jul. 9, 2020

(30) Foreign Application Priority Data

Jan. 9, 2019    (JP) .............................. JP2019-001548

(51) Int. Cl.
*B65D 81/05*    (2006.01)
*G03G 15/08*    (2006.01)
*B65D 85/30*    (2006.01)

(52) U.S. Cl.
CPC ............. *B65D 81/05* (2013.01); *B65D 85/30* (2013.01); *G03G 15/0867* (2013.01); *B65D 2585/689* (2013.01)

(58) Field of Classification Search
CPC ... B65D 81/05; B65D 85/30; B65D 2585/689
USPC ....... 206/576, 320, 701, 722, 723, 521, 591, 206/592, 594, 814
See application file for complete search history.

(56) References Cited

U.S. PATENT DOCUMENTS

| | | | | |
|---|---|---|---|---|
| 6,431,362 B1* | 8/2002 | Araki | ................. | G03G 15/0896 |
| | | | | 206/485 |
| 7,636,529 B2* | 12/2009 | Kamimura | ........... | B65D 81/113 |
| | | | | 206/320 |
| 7,992,715 B2* | 8/2011 | Kwon | .................... | G03G 15/08 |
| | | | | 206/588 |
| 2011/0069997 A1* | 3/2011 | Aoki | .................. | G03G 15/0896 |
| | | | | 399/262 |
| 2011/0073520 A1* | 3/2011 | Okuma | ................ | B65D 81/113 |
| | | | | 206/590 |
| 2012/0144783 A1* | 6/2012 | Nakamura | ............. | B65D 5/505 |
| | | | | 53/473 |
| 2014/0305838 A1* | 10/2014 | Kawata | ................ | B65D 5/5073 |
| | | | | 206/784 |

(Continued)

FOREIGN PATENT DOCUMENTS

JP    2010083529 A    4/2010
JP    2017138466 A    8/2017

*Primary Examiner* — Jacob K Ackun
(74) *Attorney, Agent, or Firm* — Alleman Hall Creasman & Tuttle LLP

(57) ABSTRACT

A cushion member includes a tubular portion and an abutting portion. The tubular portion has, in its inside, a hollow that extends in a second direction perpendicular to a first direction that is a longitudinal direction of a storage portion. The tubular portion can be elastically deformed by an external force in the first direction. The abutting portion abuts on, in the first direction, a portion of the cover portion other than the lid. An evasive cut portion is formed at a portion of the tubular portion that faces the lid of the cover portion in the first direction, the evasive cut portion being a cut that is cut into from an end of the tubular portion in the second direction.

11 Claims, 10 Drawing Sheets

(56) References Cited

U.S. PATENT DOCUMENTS

2014/0319011 A1* 10/2014 Noguchi .................. B65D 5/42
                                                          206/521
2017/0219986 A1   8/2017 Murata
2019/0144191 A1*  5/2019 Imai ..................... B65D 81/054
                                                          206/592

* cited by examiner

CUSHION MEMBER, PACKAGE BODY

INCORPORATION BY REFERENCE

This application is based upon and claims the benefit of priority from the corresponding Japanese Patent Application No. 2019-001548 filed on Jan. 9, 2019, the entire contents of which are incorporated herein by reference.

BACKGROUND

The present disclosure relates to a cushion member that is stored in a package box together with a container in which powder is stored, and relates to a package body including the cushion member.

In an electrophotographic image forming apparatus, a toner container in which toner is stored is attached to a main body portion of the image forming apparatus. The toner is a consumable product, and the toner container is a replaceable part. The toner is an example of powder.

The toner container includes a storage portion and a cover portion, wherein the storage portion stores the toner, and the cover portion is provided at an end of the storage portion in the longitudinal direction of the storage portion. The cover portion has a discharge outlet through which the toner is discharged, and the cover portion includes a lid that closes the discharge outlet.

The toner container is distributed in the market in a form of a package body stored in a package box such as a cardboard box. When the package body is distributed in the market, the toner container may be damaged if an unexpected impact or vibration is applied to the package body.

Furthermore, when an impact is applied to the cover portion of the toner container, a gap may be generated temporarily between the discharge port and the lid, and the toner in the toner container may leak outside.

In a known method, to protect the toner container from impact or the like and prevent leakage of the toner, a cushion member is stored in the package box together with the toner container. A typical example of the cushion member is a molded product of a foamable resin, or a cardboard assembly member. In addition, an air pack filled with air may be adopted as the cushion member.

SUMMARY

A cushion member according to an aspect of the present disclosure is stored in a package box together with a container that includes a storage portion and a cover portion, the storage portion storing powder, the cover portion being provided at an end of the storage portion in a first direction that is a longitudinal direction of the storage portion, the cover portion having a discharge port of the powder and a lid configured to close the discharge port, the cushion member being inserted in a gap between: an inner surface of a short side plate portion of the package box at an end of the package box in the first direction; and the cover portion of the container. The cushion member includes a tubular portion and an abutting portion. The tubular portion has, in its inside, a hollow that extends in a second direction perpendicular to the first direction, the tubular portion configured to be elastically deformed by an external force in the first direction. The abutting portion is configured to abut on, in the first direction, a portion of the cover portion other than the lid. An evasive cut portion is formed at a portion of the tubular portion that faces the lid of the cover portion in the first direction, the evasive cut portion being a cut that is cut into from an end of the tubular portion in the second direction.

A package body according to another aspect of the present disclosure includes: a package box; a container stored in the package box; and the cushion member stored in the package box together with the container. The container includes: a storage portion storing powder; and a cover portion being provided at an end of the storage portion in a first direction that is a longitudinal direction of the storage portion, the cover portion having a discharge port of the powder and a lid configured to close the discharge port.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

Figure 1:
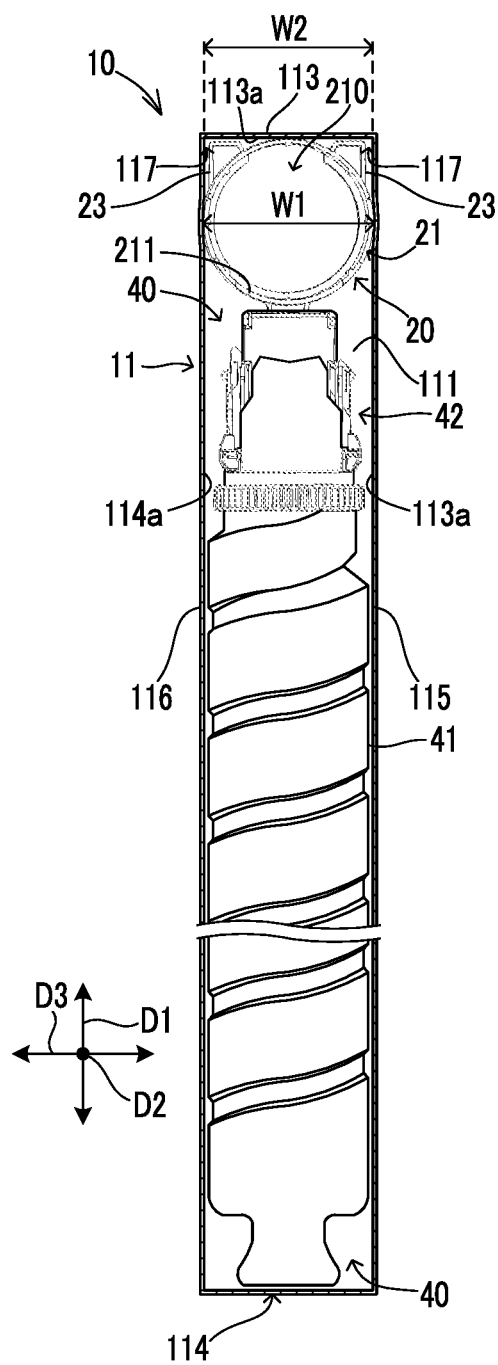
FIG. 1 is a partially cross-sectional plan diagram of a package body according to an embodiment.

A package body 10 according to the embodiment includes a toner container 40, a cushion member 20, and a package box 11 (see FIG. 1). The cushion member 20 is stored in the package box 11 together with the toner container 40. In FIG. 1, a cross section of the package box 11 is shown.

In the following description, a longitudinal direction of the package body 10 is referred to as a first direction D1. The first direction D1 extends in the horizontal direction. The toner container 40 is formed to extend in the first direction D1. That is, the longitudinal direction of the toner container 40 extends in the first direction D1, too.

In addition, two directions perpendicular to the first direction D1 are referred to as a second direction D2 and a third direction D3. The second direction D2 extends in the vertical direction, and the third direction D3 extends in the horizontal direction.

[Toner Container 40]

The toner container 40 stores toner that is supplied to a developing device of an image forming apparatus. The toner is an example of powder. The toner container 40 is a replacement part that is attached to the image forming apparatus in a detachable manner.

The image forming apparatus forms an image on a sheet by an electrophotographic method that uses developer including the toner. The sheet is an image forming medium such as a sheet of paper. The image forming apparatus is a printer, a copier, a facsimile apparatus, or a multifunction peripheral having functions of these apparatuses.

Figure 5:
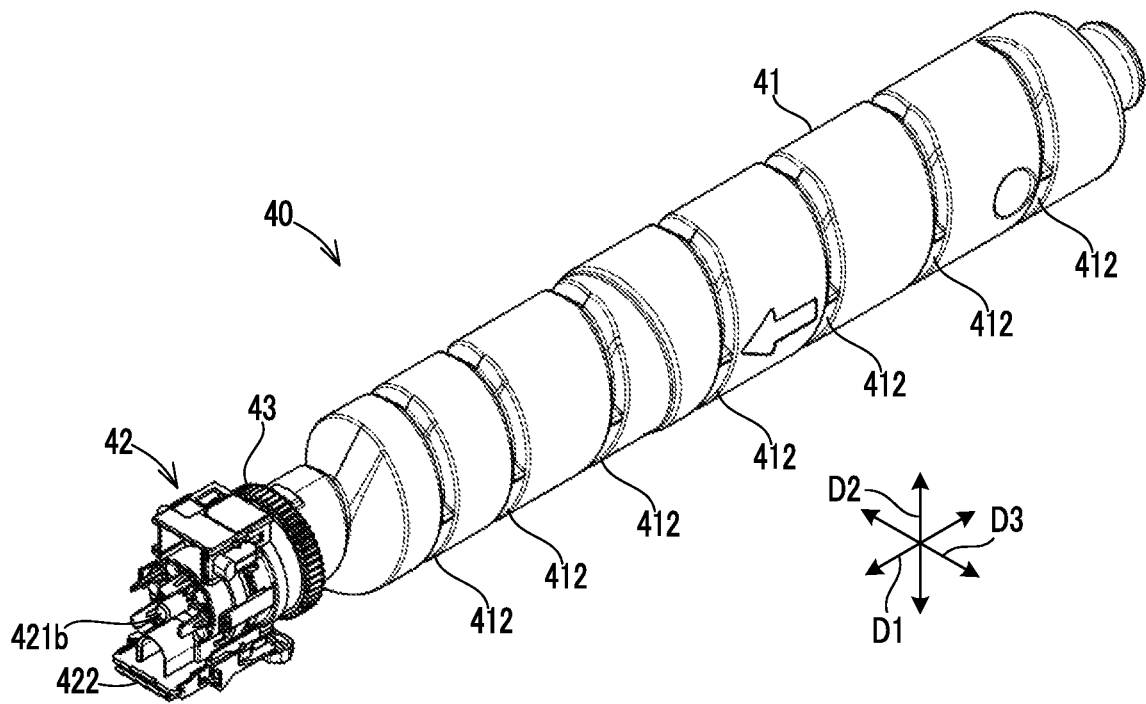
FIG. 5 is a perspective diagram of a toner container.

As shown in FIG. 5, the toner container 40 includes a storage portion 41 and a cover portion 42, wherein the storage portion 41 stores the toner, and the cover portion 42 is attached to an end of the storage portion 41. The storage portion 41 is formed in the shape of a tube whose longitudinal direction matches the first direction D1.

Figure 6:
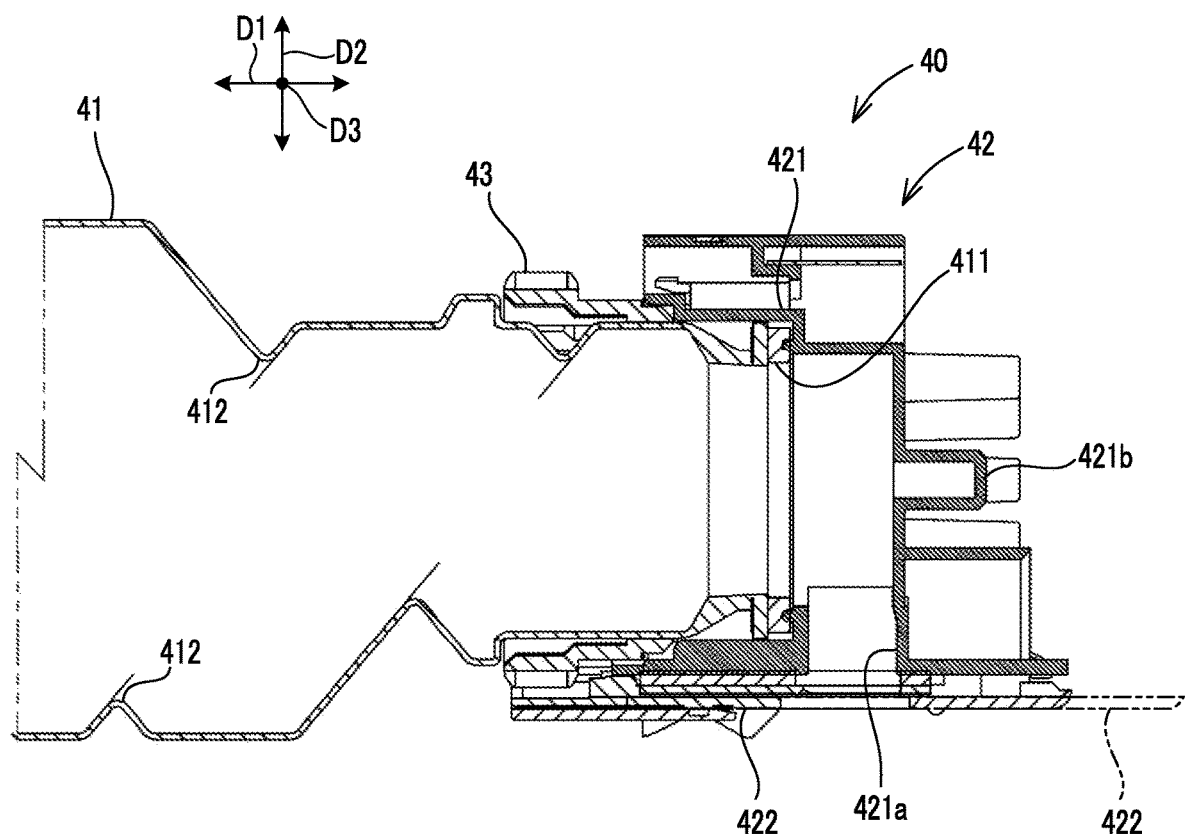
FIG. 6 is a vertical cross-sectional diagram of an end portion of the toner container.

As shown in FIG. 6, an opening 411 is formed at a first end of the storage portion 41 in the first direction D1 such that the toner can flow through the opening 411. On the other hand, a second end of the storage portion 41 in the first direction D1 is closed.

The storage portion 41 is formed from a synthetic resin such as polyethylene terephthalate. The storage portion 41 is molded from a synthetic resin by a blow molding method or an injection molding method. It is noted that the storage portion 41 may be formed from a bioresin such as polyethylene furanoate.

Figure 4:
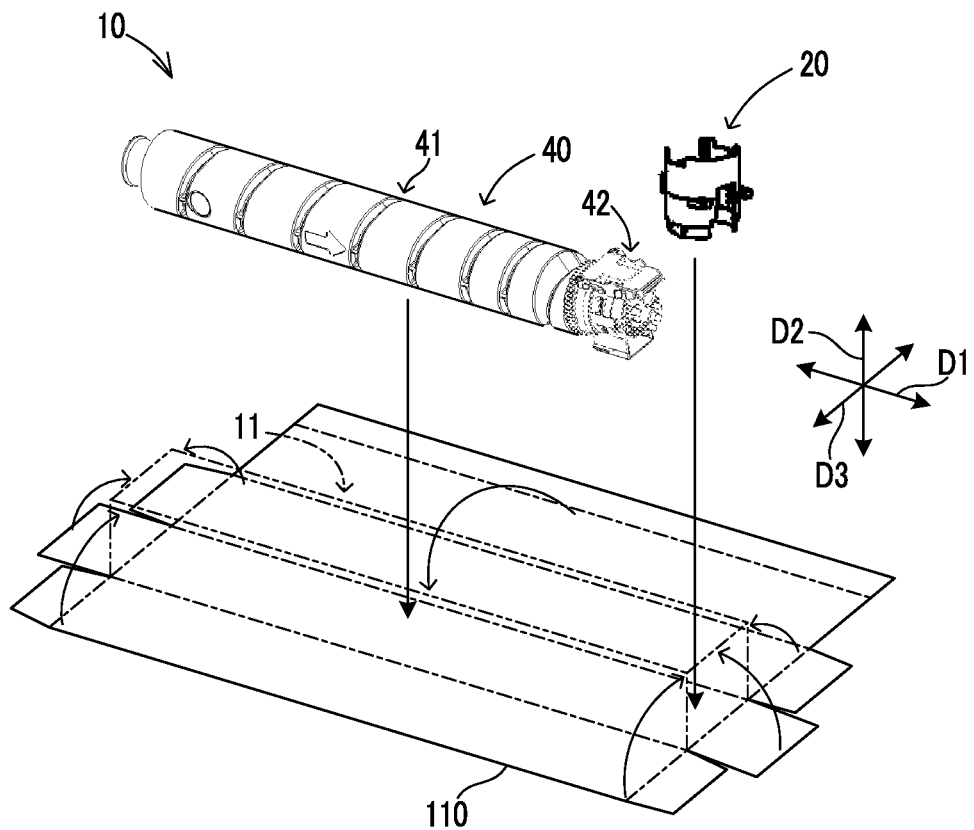
FIG. 4 is an expanded perspective diagram of the package body according to the embodiment.

As shown in FIG. 4 and FIG. 5, the storage portion 41 includes a spiral rib 412 that spirally protrudes from an inner surface thereof. When the toner container 40 is rotationally driven, the spiral rib 412 conveys the toner in the storage portion 41 toward the opening 411.

An input gear 43 of an annular shape is provided on an outer peripheral surface of the storage portion 41 at a position close to the first end. In the image forming apparatus, a motor rotates a drive gear, and the drive gear transmits a rotational force to the input gear 43.

The cover portion 42 is formed from a synthetic resin and covers the opening 411 of the storage portion 41. The cover portion 42 is composed of a plurality of members that are formed by the injection molding or the like from a thermoplastic synthetic resin.

As shown in FIG. 6, the cover portion 42 includes a base portion 421 and a lid 422, wherein the base portion 421 is attached to the first end of the storage portion 41, and the lid 422 is attached to the base portion 421. A discharge port 421a and a projection portion 421b are formed at the base portion 421.

The discharge port 421a is an outlet from which the toner in the storage portion 41 is discharged. The lid 422 is slidably supported by the base portion 421. The lid 422 is configured to slide between a closing position and an opening position, wherein when the lid 422 is at the closing position, the discharge port 421a is closed, and when the lid 422 is at the opening position, the discharge port 421a is opened.

In a state where the toner container 40 is removed from the image forming apparatus, the lid 422 is held at the closing position. The lid 422 held at the closing position prevents the toner from leaking outside the toner container 40.

On the other hand, when the toner container 40 is attached to the image forming apparatus, the lid 422 receives a pressing force from a part of the image forming apparatus, and slides from the closing position to the opening position. In FIG. 6, the lid 422 at the opening position is indicated by a solid line, and the lid 422 at the closing position is indicated by an imaginary line (two-dot chain line).

As shown in FIG. 6, the toner container 40 is attached to the image forming apparatus in a state where the discharge port 421a and the lid 422 are located at a lower end of the cover portion 42. This allows the toner in the storage portion 41 to be discharged downward from the discharge port 421a when the toner container 40 is rotationally driven.

The projection portion 421b is formed to extend in the first direction D1, and projects from the base portion 421 in an opposite direction to the storage portion 41. The projection portion 421b abuts on a part of the image forming apparatus when the toner container 40 is attached to the image forming apparatus. This determines the position of the toner container 40 in the first direction D1 in the image forming apparatus.

[Package box 11]

Figure 3:
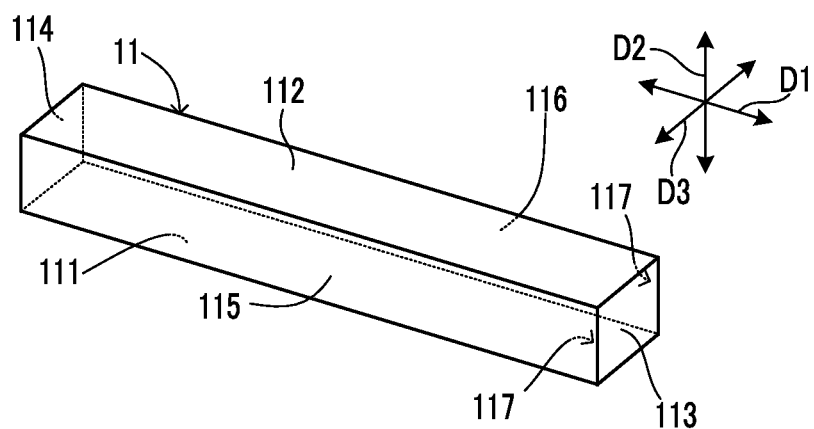
FIG. 3 is a perspective diagram of a package box.

As shown in FIG. 3, the package box 11 is a rectangular parallelepiped cardboard box. The package box 11 is assembled by folding a base material 110 which is, for example, a sheet of cardboard as shown in FIG. 4. In FIG. 4, the base material 110 is indicated by a solid line, and an assembled package box 11 is indicated by an imaginary line.

The toner container 40 is distributed in the market in the form of the package body 10 stored in the package box 11. When the package body 10 is distributed in the market, the toner container 40 may be damaged if an unexpected impact or vibration is applied to the package body 10.

Furthermore, when an impact is applied to the cover portion 42 of the toner container 40, a gap may be generated temporarily between the discharge port 421a and the lid 422, and the toner in the toner container 40 may leak outside.

Accordingly, to protect the toner container 40 from impact or the like and prevent leakage of the toner, the cushion member 20 is stored in the package box 11 together with the toner container 40.

Figure 2:
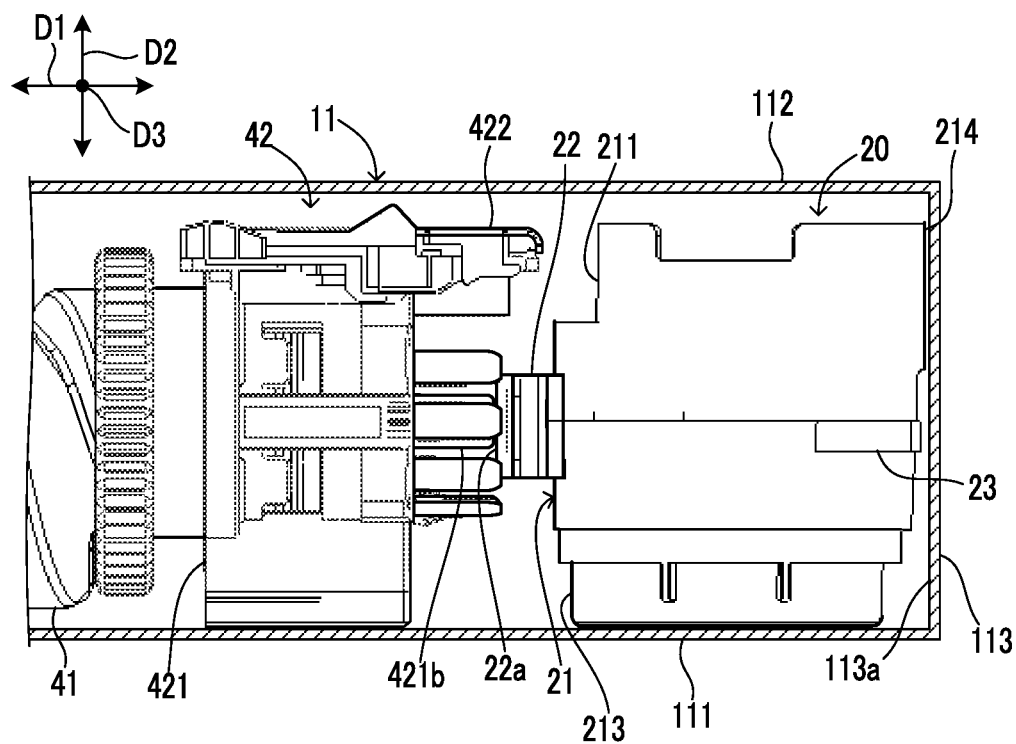
FIG. 2 is a partially cross-sectional side diagram of the package body according to the embodiment.

The cushion member 20 is stored in the package box 11 together with the toner container 40. As shown in FIG. 1 and FIG. 2, the cushion member 20 is inserted in a gap between: an inner surface of a side plate portion of the package box 11 at an end of the package box 11 in the first direction D1; and the cover portion 42 of the toner container 40.

The cover portion 42 is harder than the storage portion 41. In other words, the storage portion 41 is softer than the cover portion 42. As a result, when an impact is applied to the storage portion 41, the impact is absorbed by the soft storage portion 41. In this case, toner leakage hardly occurs to the cover portion 42.

On the other hand, when an impact is directly applied to the cover portion 42, the cover portion 42 is temporarily deformed elastically. In this case, a gap is temporarily generated between the discharge port 421a and the lid 422, and the toner in the toner container 40 may leak outside.

In the following description, a conventional cushion member, such as a molded product of a foamable resin, an air pack, or a cardboard assembly member, is referred to as a conventional member.

In addition, as shown in FIG. 3, the package box 11 includes a bottom plate portion 111, a top plate portion 112, a first side plate portion 113, a second side plate portion 114, a third side plate portion 115, and a fourth side plate portion 116. The bottom plate portion 111 and the top plate portion 112 face each other in the second direction D2.

In addition, the first side plate portion 113 and the second side plate portion 114 are a pair of side plate portions that face each other in the first direction D1. The third side plate portion 115 and the fourth side plate portion 116 are a pair of side plate portions that face each other in the third direction D3. The first side plate portion 113 and the second side plate portion 114 are short side plate portions, and the third side plate portion 115 and the fourth side plate portion 116 are long side plate portions.

The toner container 40 is stored in the package box 11 in a state where the cover portion 42 faces the first side plate portion 113. The cushion member 20 is inserted in a gap between: an inner surface 113a of the first side plate portion 113 of the package box 11 at an end of the package box 11 in the first direction D1; and the cover portion 42 of the toner container 40 (see FIG. 1, FIG. 2).

Meanwhile, there may be a case where a process of packaging the toner container 40 and the cushion member is automatized by a robot. However, it is difficult for robots to handle some of the conventional members such as the molded product of foamable resin and the air pack, and such conventional members are difficult to reuse. In addition, a cardboard assembly member, another conventional member, requires manpower for the assembling, and is difficult to reuse.

On the other hand, the cushion member 20 of the present embodiment is suitable for being handled by a robot when it is packaged in the package box 11 together with a powder container such as the toner container 40, and can be reused.

[Cushion member 20]

Figure 7:
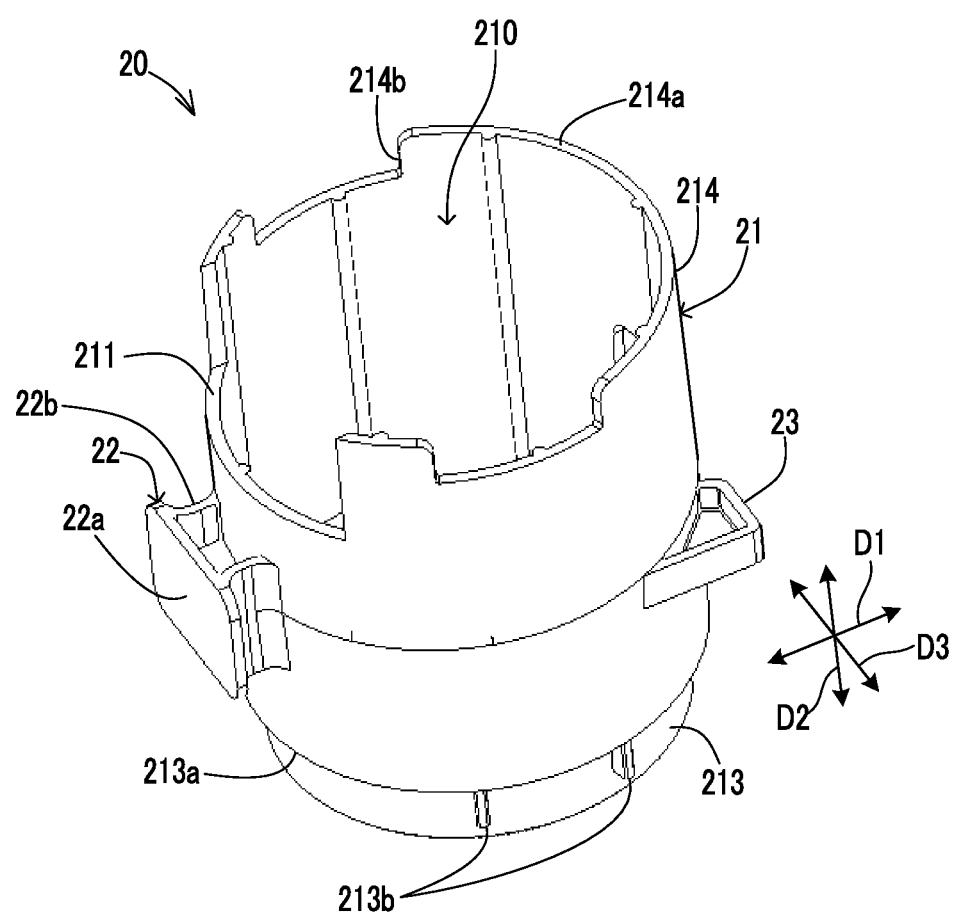
FIG. 7 is a first perspective diagram of a cushion member included in the package body according to the embodiment.
Figure 8:
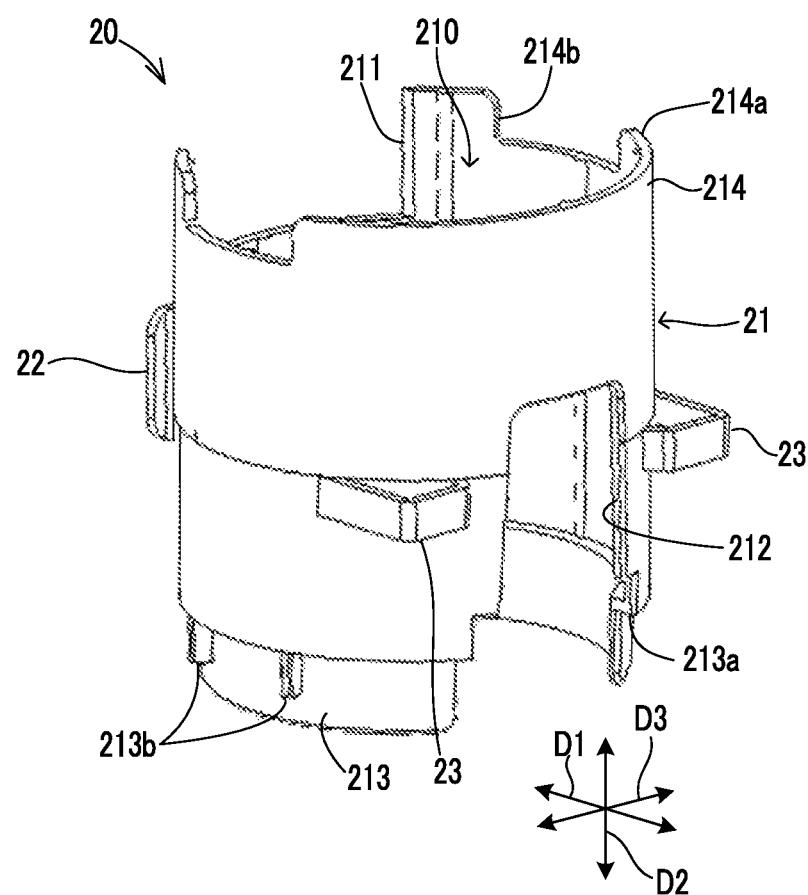
FIG. 8 is a second perspective diagram of the cushion member included in the package body according to the embodiment.

As shown in FIG. 7 and FIG. 8, the cushion member 20 includes a tubular portion 21 and an abutting portion 22. Furthermore, as shown in FIG. 8, the cushion member 20 includes a pair of brim portions 23.

The cushion member 20 is a molded product formed from a synthetic resin. For example, the cushion member 20 is formed from a synthetic resin such as polyethylene terephthalate or polyvinyl chloride.

The tubular portion 21 having, in its inside, a hollow 210 that extends in the second direction D2, is configured to be elastically deformed by an external force in the first direction D1. In the example shown in FIG. 7 and FIG. 8, the tubular portion 21 is a tube that is circular in cross-section.

The tubular portion 21 may be a tube that is elliptic in cross-section. It is noted that the shape of the tubular portion 21 in cross-section is desirably annular without a corner.

In the present embodiment, the abutting portion 22 is formed to project from the outer peripheral surface of the tubular portion 21. As shown in FIG. 2, the abutting portion 22 abuts on, in the first direction D1, a tip of the projection portion 421b of the cover portion 42 of the toner container 40. The projection portion 421b is an example of a portion of the cover portion 42 other than the lid 422.

When the package body 10 receives an impact, and the toner container 40 moves in the package box 11 toward the cushion member 20, the abutting portion 22 is pressed by the toner container 40, and the tubular portion 21 is elastically deformed. This allows the impact to be absorbed by the elastic deformation of the tubular portion 21, preventing the toner container 40 from being damaged and the toner from leaking.

An end surface 22a of the abutting portion 22 that comes in contact with the projection portion 421b of the cover portion 42, is a plane perpendicular to the first direction D1. This allows the abutting portion 22 to receive a force from the toner container 40 stably.

As shown in FIG. 2 and FIG. 7, an evasive cut portion 211 is formed at a portion of the tubular portion 21 that faces the lid 422 of the cover portion 42 in the first direction D1. The evasive cut portion 211 is a cut that is cut into from an end of the tubular portion 21 in the second direction D2.

As shown in FIG. 2, the toner container 40 is stored in the package box 11 in a state where the lid 422 is located at an upper end portion of the cover portion 42. This prevents a reaction force against a load of the toner container 40 from being applied from the bottom plate portion 111 of the package box 11 to the lid 422 or to a periphery of the lid 422.

Accordingly, in the present embodiment, the evasive cut portion 211 is formed to cut into downward from an upper end of the tubular portion 21, namely an end thereof in the second direction D2.

With the evasive cut portion 211 formed as described above, when the tubular portion 21 is elastically deformed, the lid 422 and a periphery of the lid 422 of the cover portion 42 are prevented from coming into contact with the cushion member 20.

As shown in FIG. 1, the pair of brim portions 23 are formed to protrude from two positions on the tubular portion 21 on a side opposite to the abutting portion 22. The pair of brim portions 23 have outer shapes along a pair of corner portions 117 that are provided on an inner surface of the package box 11 on both sides of the first side plate portion 113. The pair of corner portions 117 are composed of; a corner portion formed by the first side plate portion 113 and the third side plate portion 115; and a corner portion formed by the first side plate portion 113 and the fourth side plate portion 116.

The following describes an automatic packaging process of the toner container 40. As shown in FIG. 4, the toner container 40 and the cushion member 20 are placed on a portion of the base material 110 corresponding to the bottom plate portion 111 by a robot arm.

Subsequently, four portions of the base material 110 corresponding to the first side plate portion 113, the second side plate portion 114, the third side plate portion 115, and the fourth side plate portion 116 are folded by the robot to stand from the bottom plate portion 111. Furthermore, a portion of the base material 110 corresponding to the top plate portion 112 is folded to cover upper portions of the toner container 40 and the cushion member 20.

In the automatic packaging process, the cushion member 20 may be slightly displaced, in orientation and position, from a target orientation or a target position. Even in such a case, three portions of the base material 110 corresponding to the first side plate portion 113, the third side plate portion 115, and the fourth side plate portion 116 come into contact with the pair of brim portions 23 when the three portions are erected from the bottom plate portion 111, thereby playing a role of correcting the cushion member 20 in orientation and position. This eliminates, in the automatic packaging process, the need for the robot to correct the orientation of each cushion member 20 individually.

Furthermore, the pair of brim portions 23 also play a role of correcting the cushion member 20 in orientation and position after the cushion member 20 is stored in the package box 11. That is, the pair of brim portions 23 prevent the cushion member 20 from rotating in the package box 11.

Figure 9:
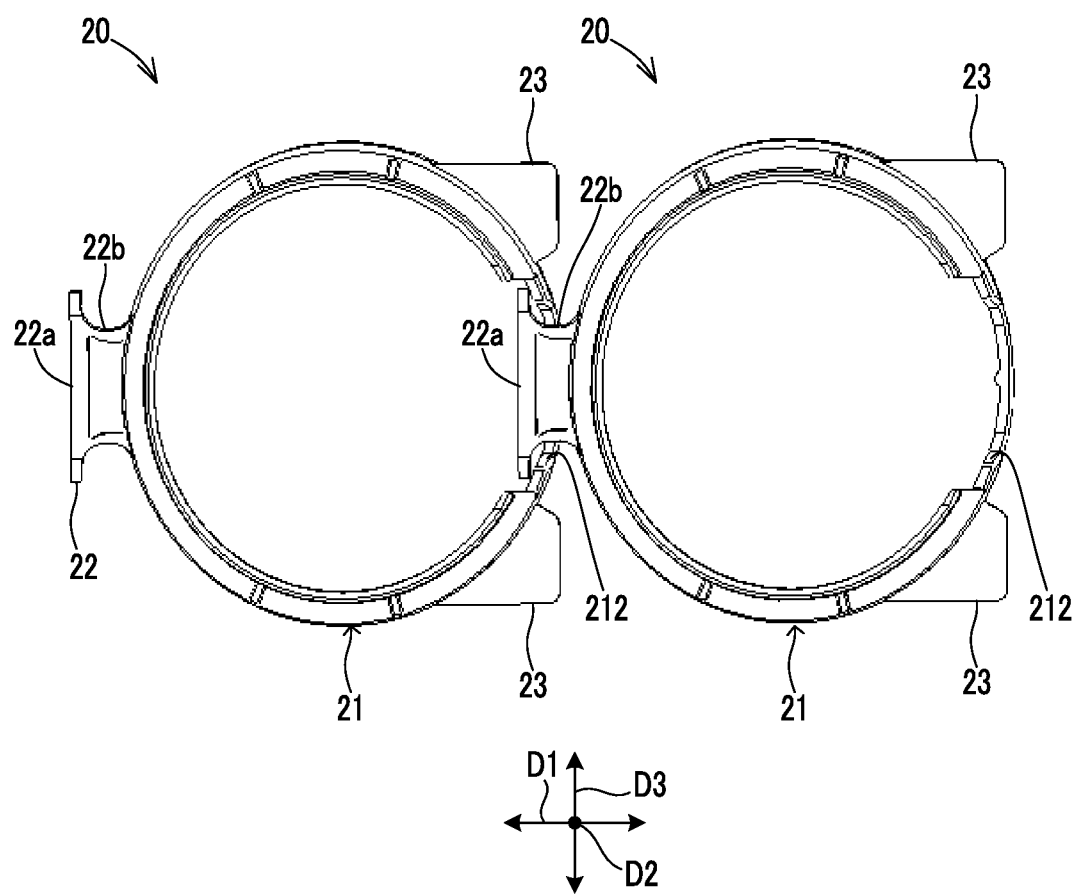
FIG. 9 is a plan diagram of two cushion members engaged with each other.

As shown in FIG. 8 and FIG. 9, an engaging cut portion 212 is formed at a portion of the tubular portion 21 on the side opposite to the abutting portion 22, wherein the engaging cut portion 212 is a cut having a shape to admit fitting of a constricted portion 22b of the abutting portion 22.

The constricted portion 22b of the abutting portion 22 is located between an end portion and a root portion of the abutting portion 22, wherein the root portion continues to the tubular portion 21. The constricted portion 22b is narrower than the end portion of the abutting portion 22. The engaging cut portion 212 is a cut that is cut into from an end of the tubular portion 21 in the second direction D2.

The engaging cut portion 212 is, at a position of the constricted portion 22b in the second direction D2, smaller than the end portion of the abutting portion 22 and larger than the constricted portion 22b in width.

As shown in FIG. 9, when a plurality of cushion members 20 are transported or preserved, the constricted portion 22b of the abutting portion 22 of one of two cushion members 20 aligned adjacent to each other, can be engaged with the engaging cut portion 212 of the abutting portion 22 of the other cushion member 20.

It is accordingly possible to preserve a plurality of cushion members 20 in a state where they are aligned at equal intervals in the horizontal direction, and they are oriented in the same direction. In addition, since the abutting portion 22 of a cushion member 20 is stored in the hollow 210 of an adjacent cushion member 20, a plurality of cushion member 20 can be arranged compactly.

As shown in FIG. 8, the evasive cut portion 211 and the engaging cut portion 212 are formed to cut into from different ends of the tubular portion 21 in the second direction D2. In the present embodiment, the evasive cut portion 211 is formed to cut into from an upper end of the tubular portion 21 in the second direction D2 downward, and the engaging cut portion 212 is formed to cut into from a lower end of the tubular portion 21 in the second direction D2 upward.

Accordingly, the robot can pick up, one by one from an end, the plurality of cushion members 20 arranged in alignment in the horizontal direction. In this case, the robot picks up the cushion members 20 in a state where the abutting portion 22 is not fitted in the engaging cut portion 212 of an adjacent cushion member 20.

To pick up a cushion member 20, the robot first inserts a plurality of fingers of its arm into the hollow 210 of the tubular portion 21 and then spreads the fingers. In this way, the robot can pick up the cushion member 20 in a state where the fingers are pressed against the inner surface of the tubular portion 21. Accordingly, the cushion member 20 is suitable for being handled by a robot when it is packaged in the package box 11 together with a powder container such as the toner container 40.

In addition, since the cushion member 20 is configured to exert the cushioning action by the elastic deformation of the tubular portion 21, the cushion member 20 may be made of a non-foamable synthetic resin. As a result, the cushion member 20 is hardly damaged when it is handled by a robot, or when it is transported as a part of the package body 10. Accordingly, the cushion member 20 is suitable for reuse, too.

Figure 10:
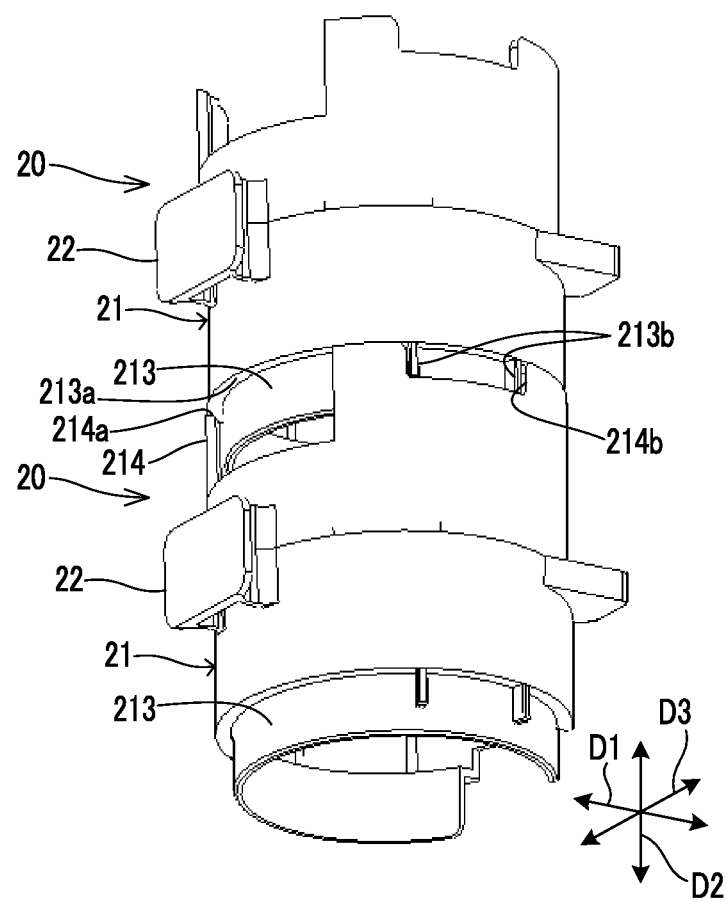
FIG. 10 is a perspective diagram of two stacked cushion members.

In addition, as shown in FIGS. 7, 8 and 10, a first end portion of the tubular portion 21 in the second direction D2 is a small-diameter portion 213 that is configured to be fitted in a second end portion of the tubular portion 21 in the second direction D2. In the following description, the second end portion of the tubular portion 21 in the second direction D2 is referred to as a large-diameter portion 214.

In the present embodiment, the small-diameter portion 213 is a lower end portion of the tubular portion 21, and the large-diameter portion 214 is an upper end portion of the tubular portion 21. The small-diameter portion 213 may be an upper end portion of the tubular portion 21, and the large-diameter portion 214 may be a lower end portion of the tubular portion 21.

In addition, a step 213a is formed at a boundary between the small-diameter portion 213 and a portion other than the small-diameter portion 213 on the outer peripheral surface of the tubular portion 21. When the small-diameter portion 213 of one of two cushion members 20 is fitted in the large-diameter portion 214 of the other, an end surface 214a of the large-diameter portion 214 comes in contact with the step 213a.

As a result, as shown in FIG. 10, when a plurality of cushion members 20 are transported or preserved, the plurality of cushion members 20 can be stacked stably by the fitting of the small-diameter portion 213 in the large-diameter portion 214.

Furthermore, as shown in FIGS. 7, 8 and 10, locking portions 213b in the shape of projections are formed at positions in the peripheral direction on the small-diameter portion 213 of the tubular portion 21. In the present embodiment, the locking portions 213b are two projections aligned in the peripheral direction of the small-diameter portion 213 with an interval therebetween.

On the other hand, locking cut portions 214b are formed at positions in the peripheral direction of the large-diameter portion 214 of the tubular portion 21 that correspond to the locking portions 213b. The locking cut portions 214b are cuts formed in a shape such that the locking portions 213b are fitted therein.

As a result, when a plurality of cushion members 20 are stacked, the locking portions 213b of one cushion member 20 lock the locking cut portions 214b of an adjacent cushion member 20 that is above or below the cushion member 20. In the present embodiment, the locking portions 213b of one cushion member 20 lock the locking cut portions 214b of an adjacent cushion member 20 that is below the cushion member 20. It is noted that in the present embodiment, the tubular portion 21 includes two locking portions 213b and two locking cut portions 214b.

The locking portions 213b and the locking cut portions 214b prevent the plurality of stacked cushion members 20 from rotating, and hold the plurality of cushion members 20 in a state of orienting in the same direction. This eliminates the need for the robot to correct the orientation of each cushion member 20 individually in the automatic packaging process.

In addition, as shown in FIG. 1, a size W1 of the tubular portion 21 in the third direction D3 is slightly larger than an interval W2 between the side plate portions 115 and 116 that face each other in the third direction D3 in the package box 11 in a natural state. The natural state means a state where no external force is applied.

For example, the difference between the size W1 and the interval W2 is larger than 0 (zero), and smaller than the thickness of each of the third side plate portion 115 and the fourth side plate portion 116.

The third side plate portion 115 and the fourth side plate portion 116 are two long side plate portions. The interval between the two long side plate portions 115 and 116 is equal to the size in the third direction D3 of the inner surface of each of the bottom plate portion 111 and the top plate portion 112 that face each other in the second direction D2.

Since the size W1 of the tubular portion 21 in the third direction D3 is slightly larger than the interval W2 between the side plate portions 115 and the fourth side plate portion 116, the outer peripheral surface of the tubular portion 21 comes in close contact with the inner surfaces of the third side plate portion 115 and the fourth side plate portion 116. As a result, the cushion member 20 is apt to be held in the same attitude in the package box 11.

APPLICATION EXAMPLE

Figure 11:
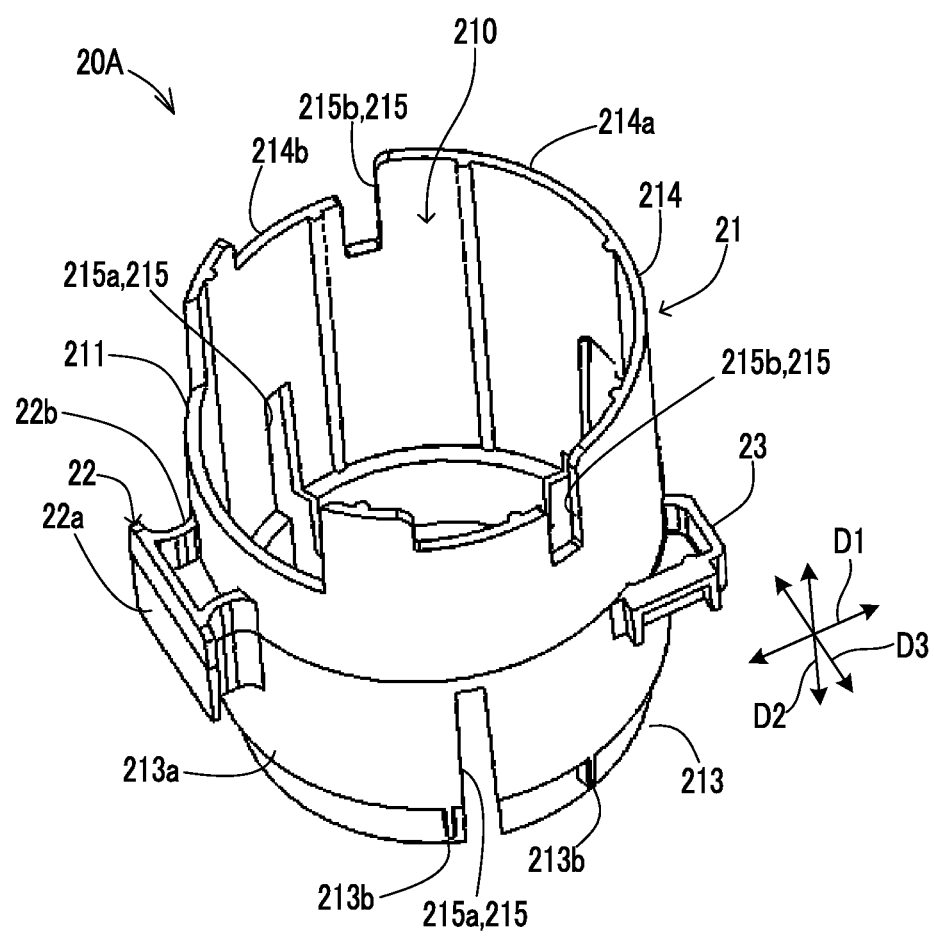
FIG. 11 is a perspective diagram of a cushion member according to an application example.
Figure 12:
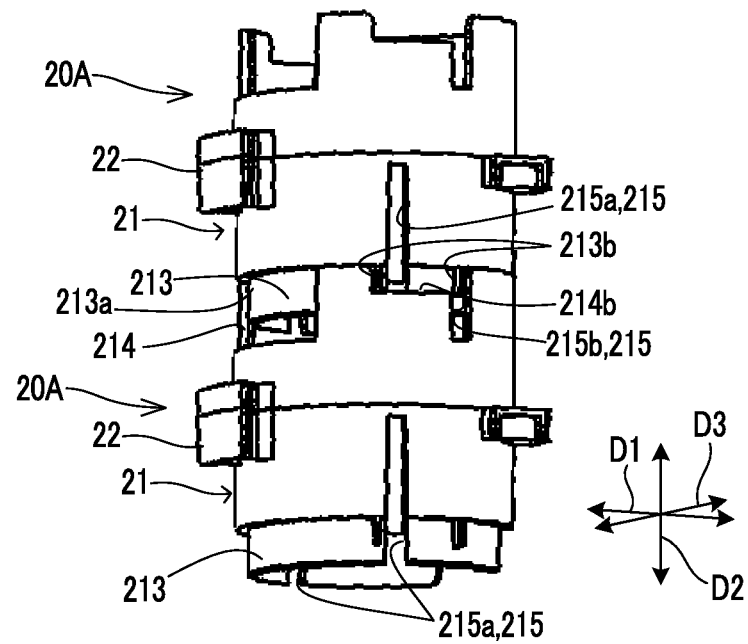
FIG. 12 is a perspective diagram of two stacked cushion members according to the application example.

Next, a description is given of a cushion member 20A that is an application example of the cushion member 20, with reference to FIG. 11 and FIG. 12. In FIG. 11 and FIG. 12, the same components as those shown in FIG. 1 to FIG. 10 are assigned the same reference signs.

The cushion member 20A is different from the cushion member 20 in that at least a pair of slits 215 are additionally formed in the tubular portion 21. In the example shown in FIG. 11 and FIG. 12, a pair of first slits 215a and a pair of second slits 215b are formed as the slits 215 in the tubular portion 21.

The pair of slits 215 are formed to cut into from an end of the tubular portion 21 in the second direction D2. The pair of first slits 215a are formed to cut into from an end of the tubular portion 21 on the small-diameter portion 213 side. On the other hand, the pair of second slits 215b are formed to cut into from an end of the tubular portion 21 on the large-diameter portion 214 side. In the example shown in FIG. 11 and FIG. 12, the pair of second slits 215b are formed to cut into further deep from the two locking cut portions 214b.

The pair of first slits 215a are formed on both sides of the evasive cut portion 211 in the tubular portion 21. In other words, the pair of first slits 215a are formed on both sides of a portion of the tubular portion 21 that continues to the abutting portion 22.

Similarly, the pair of second slits 215b are formed on both sides of the evasive cut portion 211 in the tubular portion 21.

The cushion member 20A produces the same effect as the cushion member 20. In addition, since the pair of slits 215 are formed, the tubular portion 21 of the cushion member 20A is apt to be elastically deformed upon receiving an external force in the first direction D1. That is, the cushion member 20A is superior in cushioning ability against an external force in the first direction D1.

It is noted that in the cushion member 20, 20A, a part of the outer peripheral surface of the tubular portion 21 may serve as the abutting portion 22.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A cushion member stored in a package box together with a container that includes a storage portion and a cover portion, the storage portion storing powder, the cover portion being provided at an end of the storage portion in a first direction that is a longitudinal direction of the storage portion, the cover portion having a discharge port of the powder and a lid configured to close the discharge port, the cushion member being inserted in a gap between: an inner surface of a short side plate portion of the package box at an end of the package box in the first direction; and the cover portion of the container, the cushion member comprising:
a tubular portion having, in its inside, a hollow that extends in a second direction perpendicular to the first direction, the tubular portion configured to be elastically deformed by an external force in the first direction; and
an abutting portion configured to abut on, in the first direction, a portion of the cover portion other than the lid, wherein
an evasive cut portion is formed at a portion of the tubular portion that faces the lid of the cover portion in the first direction, the evasive cut portion being a cut that is cut into from an end of the tubular portion in the second direction.

2. The cushion member according to claim 1, further comprising:
a pair of brim portions formed to protrude from two positions on the tubular portion on a side opposite to the abutting portion, the pair of brim portions being shaped along a pair of corner portions that are provided on an inner surface of the package box on both sides of the short side plate portion.

3. The cushion member according to claim 1, wherein
an end surface of the abutting portion that comes in contact with the cover portion, is a plane perpendicular to the first direction.

4. The cushion member according to claim 1, wherein
the abutting portion is formed to project from an outer peripheral surface of the tubular portion, and
an engaging cut portion is formed at a portion of the tubular portion on a side opposite to the abutting portion, the engaging cut portion being a cut that has a shape to admit fitting of a constricted portion of the abutting portion and is cut into from an end of the tubular portion in the second direction, the constricted portion being located between an end portion and a root portion of the abutting portion, the root portion continuing to the tubular portion.

5. The cushion member according to claim 4, wherein
the evasive cut portion and the engaging cut portion are formed to cut into from different ends of the tubular portion in the second direction.

6. The cushion member according to claim 1, wherein
a first end portion of the tubular portion in the second direction is a small-diameter portion that is configured to be fitted in a second end portion of the tubular portion in the second direction, and a step is formed at a boundary between the small-diameter portion and a portion other than the small-diameter portion on the outer peripheral surface of the tubular portion.

7. The cushion member according to claim 6, wherein
a locking portion in a shape of a projection is formed at a position in a peripheral direction on the small-diameter portion of the tubular portion, and
a locking cut portion is formed at a position in a peripheral direction of the tubular portion that corresponds to the locking portion, the locking cut portion being a cut formed in a shape such that the locking portion is fitted in the locking cut portion.

8. The cushion member according to claim 1, wherein
a pair of slits are formed on both sides of the evasive cut portion in the tubular portion, the pair of slits being formed to cut into from an end of the tubular portion in the second direction.

9. A package body comprising:
a package box;
a container stored in the package box and including:
a storage portion storing powder; and
a cover portion being provided at an end of the storage portion in a first direction that is a longitudinal direction of the storage portion, the cover portion having a discharge port of the powder and a lid configured to close the discharge port; and the cushion member according to claim 1 which is stored in the package box together with the container.

10. The package body according to claim 9, wherein the cover portion is harder than the storage portion.

11. The package body according to claim 9, wherein a size of the tubular portion in a third direction perpendicular to the first direction and the second direction, is larger than an interval between a pair of long side plate portions that face each other in the third direction in the package box in a natural state.

* * * * *